(12) United States Patent
Koda et al.

(10) Patent No.: US 6,487,905 B2
(45) Date of Patent: Dec. 3, 2002

(54) METHOD AND APPARATUS FOR DETECTING MOLTEN METAL LEVEL IN CONTAINER FOR MELTING METALLIC MATERIAL

(75) Inventors: Toshiyasu Koda, Nagano-ken (JP); Suinobu Kubota, Nagano-ken (JP); Yuji Hayashi, Nagano-ken (JP); Mamoru Miyagawa, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/844,465

(22) Filed: Apr. 27, 2001

(65) Prior Publication Data

US 2001/0037679 A1 Nov. 8, 2001

(30) Foreign Application Priority Data

Apr. 28, 2000  (JP) ......................................... 2000-130834

(51) Int. Cl.⁷ ............................ G01F 23/00; G01L 7/00; G01L 19/04; G01L 7/18; C21C 5/34
(52) U.S. Cl. .............................. 73/299; 73/298; 73/700; 73/708; 73/747; 75/528
(58) Field of Search ........................... 73/700, 747, 708, 73/299, 32, 438, 298, 40.7, 37.5; 75/528

(56) References Cited

U.S. PATENT DOCUMENTS 3,484,232 A  * 12/1969  Karinthi et al. ................ 75/528
3,645,127 A  *  2/1972  Mongodin et al. ............ 73/40.7

FOREIGN PATENT DOCUMENTS

| JP | 360181220 A | * | 9/1985 | .................. 75/528 |
| JP | 360250214 A | * | 12/1985 | .................. 75/528 |

* cited by examiner

*Primary Examiner*—Hezron Williams
*Assistant Examiner*—Katina Wilson
(74) *Attorney, Agent, or Firm*—Weingarten, Schurgin, Gagnebin & Lebovici LLP

(57) ABSTRACT

Upward variations of a molten metal level in a container for melting metallic material shall be carried out by detecting variations of a liquid level inside a detector connected to a gas-pipeline, wherein a rise in the pipeline pressure causes the liquid level to move down. Communication is established by means of a gas-pipeline 13 for inert gas between that portion of a container for melting metallic material which is above a molten metal surface 15a and that portion of a detector 16 comprising a transparent tubular container 18 which is above a liquid surface 17a. Variations of the liquid level 17a inside the detector 16 due to a rise in the pressure inside the above-mentioned gas-pipeline 13 are detected as upward variations of the level of the molten metal surface.

3 Claims, 3 Drawing Sheets

METHOD AND APPARATUS FOR DETECTING MOLTEN METAL LEVEL IN CONTAINER FOR MELTING METALLIC MATERIAL

BACKGROUND OF THE INVENTION

1. Field of the Invention

The present invention relates to a method and apparatus for detecting a molten metal level inside a container for melting metallic material in a case where a nonferrous metal having a low melting point, such as zinc, magnesium, or an alloy thereof, is melted to be subjected to injection molding in a liquid phase state.

2. Detailed Description of the Prior Art

It is necessary to detect molten metal levels for reasons including: the need to prevent the overflowing of molten metal stored inside a container for melting metallic material, such as a melting furnace; or the need to control operations wherein unmolten metallic material is fed into containers for melting metallic material.

Known means for detecting molten metal levels are: an indirect method using a photoelectric sensor or the like, wherein light is shed on the surface of molten metal, and the resulting reflected light is sensed to detect the molten metal level; and a direct method using a conduction sensor or the like, wherein an electrode is directly inserted in molten metal, and it is determined whether or not continuity exists between the electrode and the molten metal, thereby detecting the molten metal level.

However, in the case of either of the above-mentioned two methods, it is necessary to install a sensor in a high-temperature portion inside a container for melting metallic material, and therefore, any usable sensor is subject to restriction. Furthermore, if the container for melting metallic material is so constructed as to have an intricately complicated interior, or if the container for melting metallic material is so arranged as to have a very small interior, then it is difficult to detect the molten metal level by means of either a conventional photoelectric sensor or a conventional conduction sensor.

In particular, since the detection of a molten metal level by means of a photoelectric sensor is carried out by sensing reflected light, this method cannot be used in the case of an arrangement wherein the interior of a container for melting metallic material is bent, thus preventing the surface of molten metal from being viewed from the position where the photoelectric sensor is installed. Even if the above-mentioned interior is so arranged to permit the photoelectric sensor to be used, the construction of the portion where the photoelectric sensor is installed becomes so complicated as to present a problem in that the cost of the sensor itself becomes high.

Moreover, in the case of the direct detection of a molten metal level by means of a conduction sensor, molten metal is prone to remain attached to the electrode portion located at the tip of the conduction sensor. The molten metal attached as above presents no particular problem in the event that the interior of a container for melting metallic material is large enough to permit a sufficient distance to be secured between the conduction sensor and the wall surface of the container. However, if the interior of a container for melting metallic material is small, then the distance between the conduction sensor and the wall surface of the container is inevitably short, and therefore, the electrode portion of the sensor and the wall of the container are prone to contact each other on account of the molten metal attached to the electrode portion, resulting in continuity being present at all times. Consequently, the conductivity sensor loses its function, thus presenting problems such as failure to carry out detection.

Furthermore, in addition to the above-mentioned methods for detection, there exists a method wherein inert gas is adopted as a detecting medium; the through-flow and the absolute value of the pressure of the inert gas introduced into molten metal are measured; the distance between the surface of the molten metal and the location through which the inert gas is introduced is determined on the basis of the value of the absolute pressure and the value of the pressure acting on the surface of the molten metal; and the molten metal level is electrically detected and adjusted on the basis of the above-mentioned distance. In the case of this method, the difference between the value of the absolute pressure and the value of the pressure acting on the surface of the molten metal is so minute that it is difficult to detect variations of the above-mentioned difference by means of a normal pressure gage, and therefore it is necessary to use a high-precision, costly pressure measuring instrument.

SUMMARY OF THE INVENTION

It is an object of the present invention to provide a means for solving the above-mentioned problems caused by conventional photoelectric and conduction sensors, wherein inert gas which is fed into a container for melting metallic material, for the purpose of preventing molten metal from being oxidized, is adopted as the detecting medium. It is yet another object of the present invention to provide a new method and apparatus for detecting a molten metal level inside a container for melting metallic material, wherein variations of a molten metal level are detected on the basis of variations of a liquid level inside a detector caused by a rise in the pressure inside a pipeline; and even if changes in the pressure inside the pipeline is minute, a very simple arrangement is capable of reliably detecting the rise of the surface of molten metal at all times without requiring any high-precision pressure measuring apparatus to be used.

For the purpose of achieving the above-mentioned objects, the present invention provides a method wherein communication is established by means of a gas-pipeline for inert gas between that portion of a container for melting metallic material which is above the molten metal surface inside the above-mentioned container for melting metallic material and that portion of a detector comprising a transparent tubular container which is above the liquid surface inside the above-mentioned detector, and variations of the liquid level inside the detector due to a rise in the pressure inside the gas-pipeline are detected as upward variations of the molten metal level.

Furthermore, the apparatus according to the present invention comprises: a gas-pipeline for inert gas whose open end is inserted in a container for melting metallic material, wherein the opening of the above-mentioned open end is caused to face into that portion of the above-mentioned container which is below a supply port and which is above the surface of molten metal inside the above-mentioned container; a detector comprising a transparent tubular container, in which the interior of the above-mentioned tubular container is partitioned with a transparent partition wall to constitute a double structure having an inner portion and an outer portion, a plurality of liquid chambers are thus formed, the cross-sectional area of each of the above-mentioned liquid chambers is equal to that of the other, communication is established between the lower portions of the above-mentioned liquid chambers, the interior of the above-mentioned tubular container is filled with a required quantity of detecting liquid consisting of a liquid material having a low specific gravity, the upper portion of the above-mentioned tubular container is sealed, the central liquid chamber serves as a measuring chamber, and a liquid level gage is provided in the upper portion of the above-mentioned central chamber: wherein that liquid chamber in the above-mentioned detector which serves as the measuring chamber is connected to the above-mentioned gas-pipeline to establish communication between that portion of the above-mentioned container for melting metallic material which is above the surface of the molten metal inside the above-mentioned container for melting metallic material and that portion of the above-mentioned measuring chamber which is above the surface of the detecting liquid inside the above-mentioned measuring chamber; communication is further established by means of a pipeline between that portion of the outside liquid chamber which is above the liquid surface inside the above-mentioned outside liquid chamber and that portion of the above-mentioned container for melting metallic material which is above the surface of the molten metal inside the above-mentioned container for melting metallic material; and variations of liquid levels inside both of the liquid chambers due to a pressure rise in the above-mentioned gas-pipeline can be detected as upward variations of the molten metal level.

Yet another form of the above-mentioned detector comprises: a plurality of liquid chambers consisting of a pair of transparent tubular containers disposed side by side, wherein communication is established between the lower portions of the transparent tubular containers; detecting liquid consisting of a liquid material having a low specific gravity which is disposed inside each of said liquid chambers; and a liquid level gage disposed in the upper portion of each of said liquid chambers, with the upper portion of each of the above-mentioned tubular containers sealed: wherein both of the above-mentioned liquid chambers serve as measuring chambers; one of the above-mentioned liquid chambers is connected to the above-mentioned gas-pipeline; communication is established by means of a pipeline between the rest of the above-mentioned liquid chambers and that portion of the container for melting metallic material which is above the surface of the molten metal inside the container for melting metallic material; and variations of liquid levels inside both of the liquid chambers due to a rise in the pressure inside the gas-pipeline can be detected as upward variations of the molten metal level.

In the case of such an arrangement, it is the most desirable that the inside cross-sectional area of one of the two liquid chambers be set equal to that of the other. However, in the event that the inside cross-sectional area of the liquid chamber connected to the gas-pipeline is set larger than that of the liquid chamber connected to the pipeline, then variations of the liquid levels in both liquid chambers can be easily detected. Moreover, in the event that a colored or pigmented liquid is adopted, then visual confirmation of variations of the liquid levels can be easily carried out.

Furthermore, according to the present invention, even if a slight increase takes place in the pressure inside the gas-pipeline, the surface of the. liquid in the measuring chamber reacts, resulting in the above-mentioned liquid surface lowering, while the surface of the liquid in the liquid chamber connected to the pipeline rises. Therefore, such a rise can be detected as a rise exceeding a set level of the molten metal surface.

As regards the arrangement, it is sufficient to connect the detector to the gas-pipeline for inert gas, which is a means for preventing oxidation, and to the pipeline for establishing communication with the interior of the container for melting metallic material. Consequently, the present invention can be applied widely without being restricted by internal constructions of containers for melting metallic material such as melting furnaces.

DETAILED DESCRIPTION OF THE PREFERRED EMBODIMENT

Figure 1:
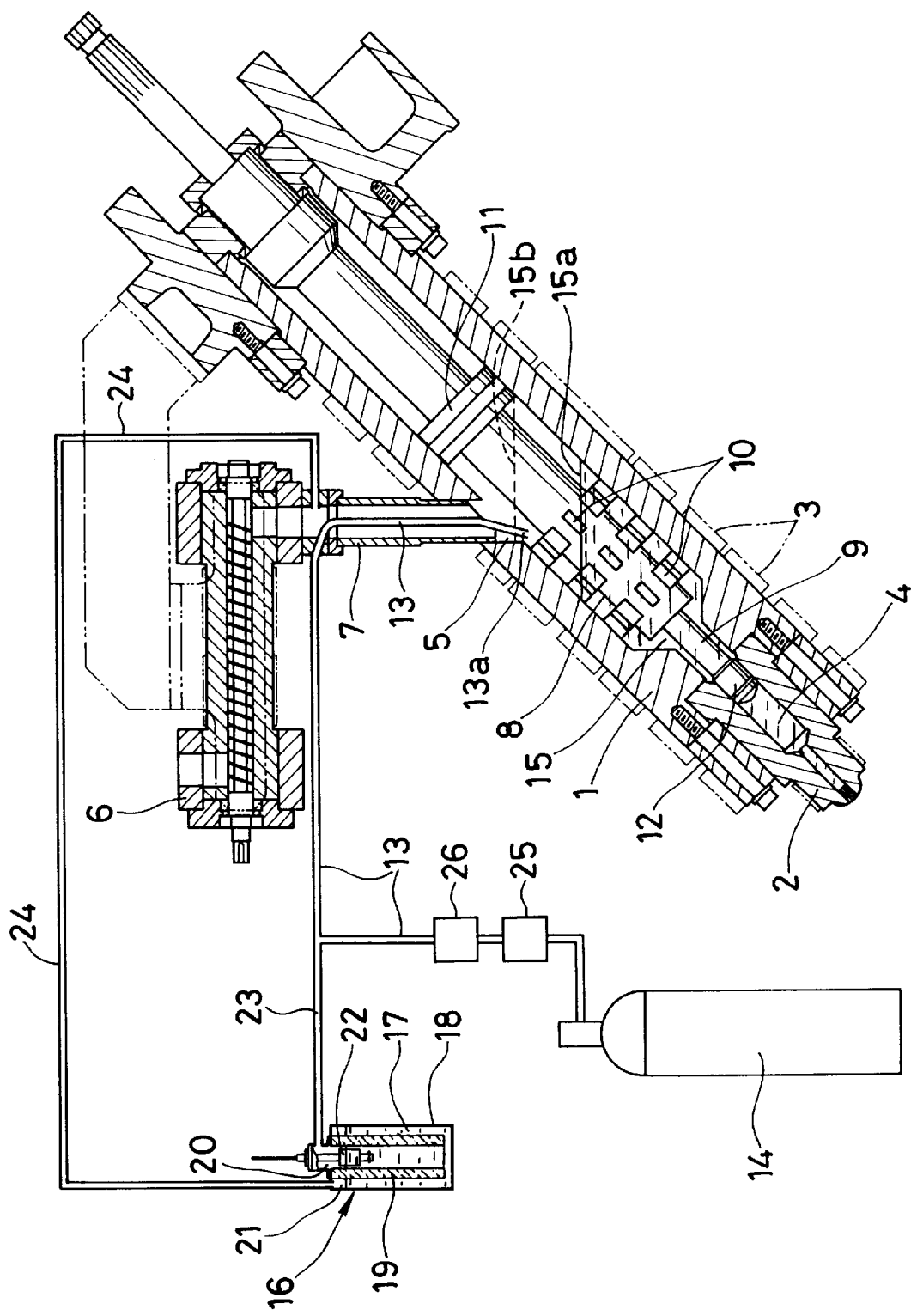
FIG. 1 is a longitudinal sectional view of an apparatus for detecting molten metal level inside a container for melting metallic material of the present invention.

FIG. 1 shows a container for melting metallic material which comprises a cylindrical body having band heaters 3 around the exterior periphery. This container for melting metallic material 1 is placed obliquely at an angle of 45 degrees with a clamping apparatus (not shown) in such a way that a nozzle member 2 which is disposed at the front end faces downward. Moreover, the interior of that end portion of the container for melting metallic material 1 which communicates with the nozzle member 2 is formed into a metering chamber 4 which has a required length and whose outside diameter is reduced to a dimension smaller than the inside diameter of the container for melting metallic material 1.

A supply port 5 is bored in the upper side of the middle portion of the container for melting metallic material 1, and a metallic material feeder 6 is disposed with a feeding tube 7 connected to the above-mentioned supply port 5. Furthermore, the rear end of the container for melting metallic material 1 is left open. An agitating member 8 and an injecting member 9, which constitute means for agitating and injecting molten metal 15, respectively, are inserted in the container for melting metallic material 1 through the above-mentioned rear end.

The above-mentioned agitating member 8 comprises a rotary shaft on whose exterior periphery are provided a plurality of circumferential rows of agitating vanes 10, with vanes in each row formed discontinuously. The above-mentioned agitating vanes 10 each have an outside diameter which is approximately equal to the inside diameter of the container for melting metallic material 1. Moreover, around that portion of the above-mentioned rotary shaft which is aft of the agitating vanes 10 is integrally formed a partitioning flange 11 which also serves as a guide and which is in contact with the interior periphery of the container for melting metallic material 1.

The above-mentioned injecting member 9 has a rod provided in the central portion of the agitating member 8 in such a way as to be permitted to slide freely, and at the front end of the above-mentioned rod is provided an injecting plunger 12 which protrudes from the front face of the agitating member 8 to be fitted in the above-mentioned metering chamber 4. The injecting member 9 travels forward along with the above-mentioned plunger 12 in such a way that a required quantity of molten metal stored in the metering chamber 4 is injected through the nozzle member 2 into a mold which is not shown until the above-mentioned mold is filled with molten metal.

Item 13 is a gas-pipeline for inert gas such as argon, to which is connected a pressure vessel 14. An open end 13a of the above-mentioned gas-pipeline 13, which is nozzle-shaped, is inserted in the interior of the above-mentioned container for melting metallic material 1 in such a way that the opening of the above-mentioned open end 13a is located in the neighborhood of agitating vanes 10, which are disposed below the supply port 5, thus facing downward on a molten metal surface 15a. Furthermore, in that portion of the gas-pipeline 13 which is in the neighborhood of the pressure vessel 14 are provided a pressure reducing valve 25 and a flow control valve 26, thereby permitting the gas pressure and the gas flow to be controlled.

Figure 2:
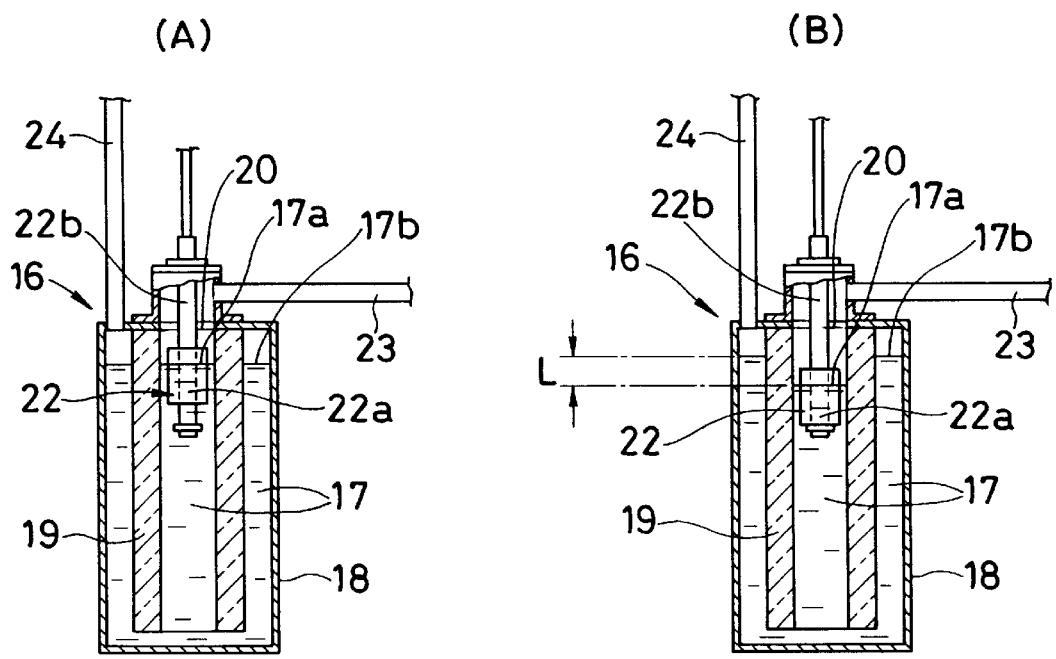
FIG. 2 shows two longitudinal sectional front views of a detector for the above-mentioned apparatus: one with a normal liquid level, and the other with a displaced liquid level.

Item 16 is a detector for detecting molten metal levels, wherein the interior of a transparent tubular container 18 is partitioned with a transparent tubular partition wall 19 to constitute a double structure having an inner portion and an outer portion, a plurality of liquid chambers 20 and 21 are thus formed, the cross-sectional area of each of the above-mentioned liquid chambers is equal to that of the other, communication is established between the lower portions of the above-mentioned liquid chambers 20 and 21, the above-mentioned tubular container 18 is filled with a required quantity of liquid, such as water or oil, whose specific gravity is as low as possible and which serves as detecting liquid 17, the upper portion of the tubular container 18 is sealed, the liquid chamber 20, whose longitudinal section is oblong and which is located at the center, serves as a measuring chamber, a supporting rod 22b for a liquid level gage 22 fitted with an electric cable is disposed in the upper portion of the liquid chamber 20, and the above-mentioned liquid level gage 22 is installed vertically from above through the above-mentioned supporting rod 22b in such a way that a detecting portion 22a of the liquid level gage 22 is positioned on a level with a liquid surface 17a. (see FIG. 2).

The above-mentioned detecting portion 22a of the liquid level gage 22 is constructed in a conventional manner. Namely, through the above-mentioned supporting rod 22b fitted with a stop at its lower end, a float type switch is inserted in such a way as to be permitted to move up and down freely, wherein the above-mentioned switch itself goes down in conjunction with the lowering of the level of the liquid surface 17a, thereby electrically detecting the lowering of the liquid level.

Furthermore, in the case of a detector 16, which is so arranged to be entirely transparent, variations of the level of the liquid surface 17b in the liquid chamber 21 can be visually confirmed, this method being additional to electrical detection.

The above-mentioned detector 16 is used by being placed vertically in the neighborhood of the container for melting metallic material 1. As shown in FIG. 1, the liquid chamber 20 (the measuring chamber), which is located at the center, is connected to the gas-pipeline 13, thereby establishing communication by means of the gas-pipeline extension 23 between that portion of the container for melting metallic material 1 which is above the molten metal surface 15a and that portion of the liquid chamber 20 which is above the liquid surface 17a. On the other hand, the liquid chamber 21, which is the outer portion, is connected to a pipeline 24 that opens into the upper portion of the above-mentioned feeding tube 7, thereby establishing communication between that portion of the liquid chamber 21 which is above the liquid surface 17b and that portion of the container for melting metallic material 1 which is above the molten metal surface 15a.

By merely implementing the arrangement described above in this paragraph, variations of the levels of both liquid surfaces 17a and 17b can be detected as upward variations of the level of the molten metal surface 15a.

In the case of such an arrangement, both liquid surfaces 17a and 17b are under the same atmospheric pressure owing to the communication established by means of the gas-pipeline 13 between that portion of the liquid chamber 20 which is above the liquid surface 17a and that portion of the container for melting metallic material 1 which is filled with gas, as well as on account of the communication established by means of the pipeline 24 between that portion of the liquid chamber 21 which is above the liquid surface 17b and that portion of the container for melting metallic material 1 which is filled with gas. Moreover, the pressure in the container for melting metallic material 1, which communicates with the measuring chamber 20 by means of the gas-pipeline 13, is equal to the pressure in the measuring chamber 20. Consequently, even if any change takes place in the pressure inside the container for melting metallic material 1 owing to any change in the quantity of gas supplied, no difference arises in the levels of both liquid surfaces 17a and 17b, resulting in the same level being maintained in a state of equilibrium.

Normally, inert gas fed into the container for melting metallic material 1 via the gas-pipeline 13 from the above-mentioned pressure vessel 14 jets out, without encountering any resistance, through the open end 13a into that portion of the container for melting metallic material 1 which is above the molten metal surface 15a, thereby forming an inert gaseous atmosphere for preventing molten metal from being oxidized, provided that the quantity of molten metal stored complies with a set value, with the molten metal surface 15a positioned below the open end 13a.

However, in the event that the quantity of stored molten metal increases on account of factors like excessive feeding of metallic material or improper injection to such a extent that the level of the molten metal surface 15a rises above a set value, with the open end 13a submerged below the raised molten metal surface 15b, thereby causing the opening to be blocked by the ingress of molten metal, then it follows that inert gas, pushing out molten metal from inside the opening under its own pressure, passes through the molten metal, in bubbles, to jet out into the container for melting metallic material 1 from the raised molten metal surface 15b. This phenomenon causes the jetting of inert gas to encounter resistance, resulting in a pressure rise in the gas-pipeline 13.

The amount of the above-mentioned pressure rise in the gas-pipeline 13 is so minute that it is difficult to detect the level of the molten metal surface 15a by directly detecting the above-mentioned pressure rise by means of a pressure gage. However, the measuring chamber 20, which communicates with the gas-pipeline 13, is affected by the above-mentioned pressure rise, and moreover the specific gravity of the detecting liquid 17 is greatly different from that of metal. Therefore, the detecting liquid 17 reacts even to a minute pressure rise in the gas-pipeline 13, thus causing the liquid surface 17a to be pushed downward.

In conjunction with the lowering of the liquid surface 17a, the detecting portion of the above-mentioned liquid level gage 22 moves down to turn on the switch, thereby permitting variations of the level of the liquid surface 15a to be detected electrically. Furthermore, in conjunction with the lowering of the liquid surface 17a in the measuring chamber 20, a rise take place, on the contrary, in the level of the liquid surface 17b in the liquid chamber 21, which is the outer portion and whose lower portion communicates with the lower portion of the measuring chamber 20. Consequently, the above-mentioned lowering and rise of the liquid surfaces put together cause the amount (L) of the difference between the liquid levels to increase, thereby permitting variations of the level of the molten metal 15a to be directly confirmed by looking through the transparent tubular container 17 from outside.

The greater the difference is between the specific gravity of molten metal and that of the detecting liquid 17 used in the detector 16, the more appreciable becomes the amount of variation of the level of the above-mentioned liquid surface 17a. For example, if oil is adopted as the detecting liquid 17, then the pertinent relational express is as follows.

$$L2 = L2 \times (\gamma1 \div \gamma2)$$

where

L1=Distance over which molten metal is pushed down

L1=Distance over which oil is pushed down (Difference between liquid levels)

γ1=Specific gravity of metal

γ1=Specific gravity of oil

Figure 3:
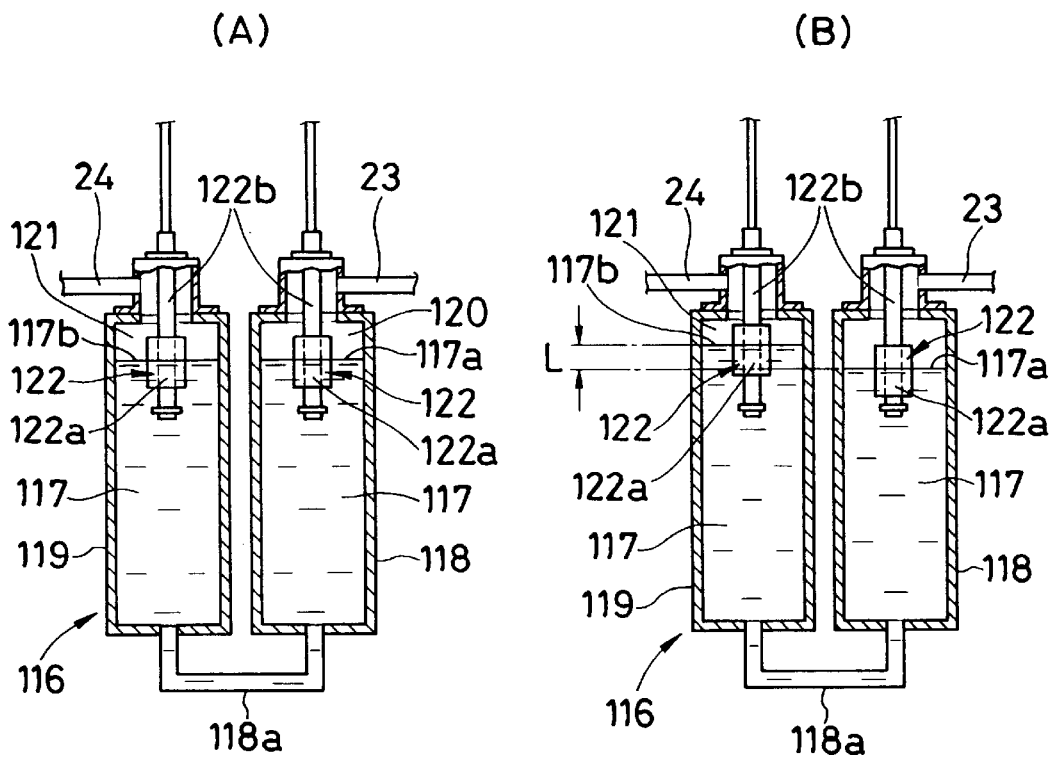
FIG. 3 shows two longitudinal sectional front views of a detector of the second embodiment: one with a normal liquid level, and the other with a displaced liquid level.

FIG. 3 shows a detector 116 of another embodiment of the present invention, wherein a plurality of liquid chambers 20 and 21, which are disposed side by side, serve as metering chambers.

Figure 4:
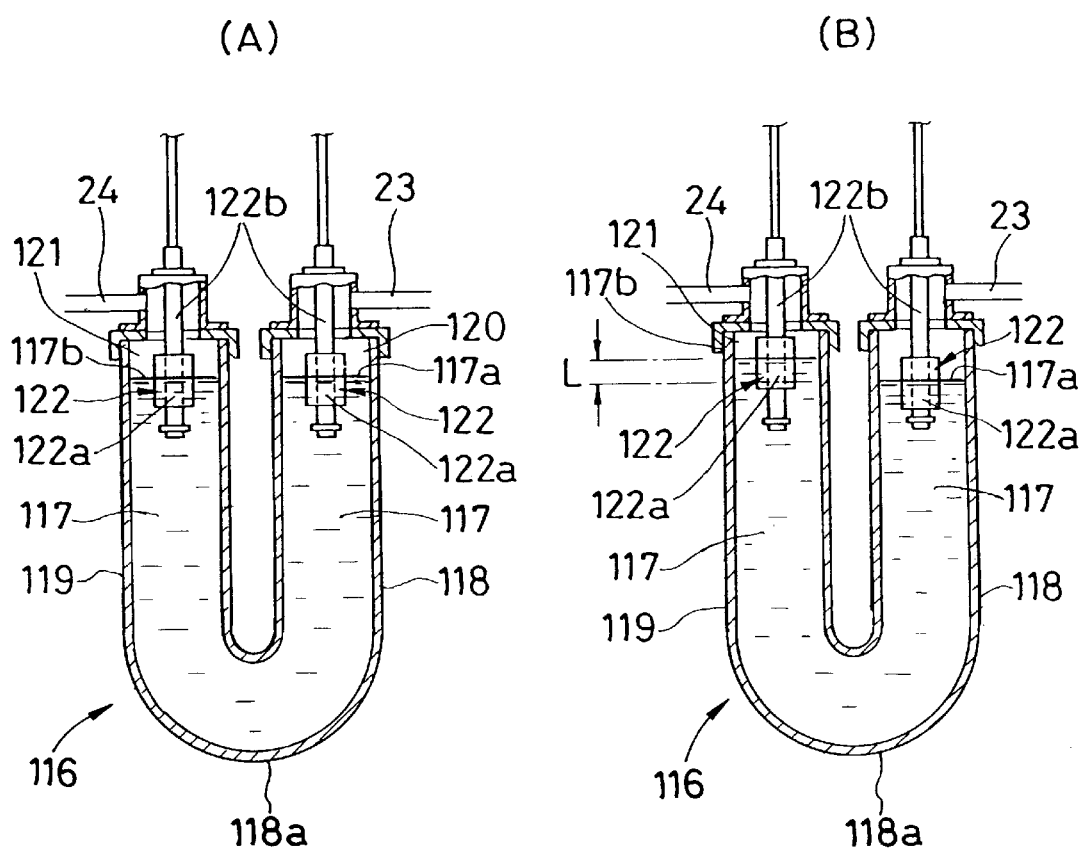
FIG. 4 shows two longitudinal sectional front views of a detector of the third embodiment: one with a normal liquid level, and the other with a displaced liquid level.

The above-mentioned detector 116 comprises a plurality of liquid chambers 120 and 121, wherein a pair of tubular containers 118 and 119 which are both made of a material such as acrylic resin and whose cross-sectional areas are equal to each other are disposed side by side, and communication is established by means of a passage 118a between the lower portion of the tubular container 118 and that of the tubular container 119. Furthermore, FIG. 4 shows yet another embodiment of the present invention, wherein a detector 116 comprises a pair of tubular containers 118 and 119 which are each formed into a U-shape.

The above-mentioned liquid chambers 120 and 121 are each filled with a required quantity of detecting liquid 117 which consists of the above-mentioned liquid material having a low specific gravity. Moreover, the upper portion of each of the above-mentioned tubular containers 118 and 119 is sealed. In the upper portion of each of the liquid chambers 120 and 121 is disposed a support rod 122b for a liquid level gage 122 fitted with an electric cable. The above-mentioned liquid level gage 122 is vertically installed from above through the above-mentioned support rod 122b in such a way that a detecting portion 122a comprising a float type switch is positioned at the level of the liquid surface 117a in the case of the liquid chamber 120 and at the level of the liquid surface 117b in the case of the liquid chamber 121.

In this arrangement, the switch constituting the detecting portion 122a of the liquid level gage 122 in the liquid chamber 120, which is connected to a gas-pipeline, is turned on when the detecting portion 122a moves down, while the switch constituting the detecting portion 122a of the liquid level gage 122 in the liquid chamber 121, which is connected to a pipeline, is turned on when the detecting portion 122a moves up.

As regards the above-mentioned detector 116, both the liquid chambers 120 and 121 serve as measuring chambers. One of the liquid chambers 120 15 and 121 is connected to the above-mentioned gas-pipeline 13 shown in FIG. 1, and the rest of the liquid chambers 120 and 121 is caused to communicate, by means of the above-mentioned pipeline 24, with that portion of the interior of the container for melting metallic material 1 which is above the molten metal surface 15a. Relative variations of the liquid levels in the liquid chambers 120 and 121 can be thus detected electrically by means of the two liquid level gages 122, one of which is provided in the liquid chamber 120 and the rest of which is provided in the liquid chamber 121. Moreover, the difference between the level of the liquid surface 117a at right and the level of the liquid surface 117b at left can be visually confirmed by looking through both the transparent tubular containers 118 and 119.

As described above, according to the present invention, even a slight rise in the pressure inside the gas-pipeline for feeding inert gas into the container for melting metallic material causes a reaction of the liquid surfaces in the detector connected to the gas-pipeline, resulting in a variation of the levels of the above-mentioned liquid surfaces. Consequently, a difference arises between the levels of the above-mentioned liquid surfaces, thus making it possible to detect such a rise in the molten metal surface as exceeds a set level, thereby permitting overflowing to be controlled. Furthermore, in the event that the molten metal surface moves down, resulting in the open end of the gas-pipeline being opened, then the liquid surfaces in the detector return synchronously to their respective original levels, and the liquid level gage also moves up to its original position. Therefore, it is not necessary to either set or correct the liquid level in the detector on all such occasions. Moreover, erroneous detection due to aging is not prone to occur. Such being the case, the apparatus of the present operation sufficiently withstands extended operations in severe high-temperature environments.

What is claimed is:

1. A method for detecting a molten metal level inside a container for melting metallic material, wherein communication is established by means of a gas-pipeline for inert gas between a portion of said container which is above a surface of molten metal inside said container and a portion of a detector comprising a transparent tubular container which is above a surface of detecting liquid inside detector; and variations of a liquid level inside said detector due to a rise in a pressure inside said gas-pipeline are detected as upward variations of the molten metal level.

2. An apparatus or detecting a molten metal level inside a container for melting metallic material, comprising:

a gas-pipeline for inert gas, an open end of said gas-pipeline being inserted in said container for melting metallic material, the opening of said open end being caused to face into a portion of said container for melting metallic material which is below a supply port and which is above a surface of molten metal inside said container for melting metallic material; and a detector comprising a transparent tubular container, an interior of said transparent tubular container being partitioned with a transparent partition wall to constitute a double structure having an inner portion and an outer portion, a plurality of liquid chambers being thus formed, communication being established between a lower portions of said plurality of liquid chambers, the interior of said transparent tubular container being filled with a required quantity of detecting liquid consisting of a liquid material having a low specific gravity, an upper portion of said transparent tubular container being sealed, a central liquid chamber serving as a measuring chamber, a liquid level gage being provided in an upper portion of said measuring chamber: wherein that liquid chamber in said detector which serves as the measuring chamber is connected to said gas-pipeline to establish communication between the portion of said container for melting metallic material which is above the surface of said molten metal and a portion of said measuring chamber which is above the surface of said detecting liquid;

communication is further established by means of a pipeline between a portion of the outer liquid chamber which is above the surface of said detecting liquid and a portion of said container for melting metallic material which is above the surface of said molten metal; and variations of liquid levels inside both of said liquid chambers due to a pressure rise in said gas-pipeline can be detected as upward variations of said molten metal level.

3. An apparatus for detecting a molten metal level inside a container for melting metallic material as defined in claim 2, wherein said detector comprises:

a plurality of liquid chambers consisting of a pair of transparent tubular containers disposed side by side, communication being established between the lower portions of said transparent tubular containers;

detecting liquid consisting of a liquid material having a low specific gravity, said detecting liquid being disposed inside each of said liquid chambers; and a liquid level gage disposed in the upper portion of each of said liquid chambers, the upper portion of each of said transparent tubular containers being sealed: wherein both of said liquid chambers serve as measuring chambers;

one of said liquid chambers is connected to said gas-pipeline;

communication is established by means of a pipeline between the rest of said liquid chambers and the portion of said container for melting metallic material which is above the surface of said molten metal; and variations of liquid levels inside both of said liquid chambers due to a rise in the pressure inside said gas-pipeline can be detected as upward variations of said molten metal level.

* * * * *

UNITED STATES PATENT AND TRADEMARK OFFICE
CERTIFICATE OF CORRECTION

PATENT NO.    : 6,487,905 B2
DATED         : December 3, 2002
INVENTOR(S)   : Toshiyasu Koda et al.

It is certified that error appears in the above-identified patent and that said Letters Patent is hereby corrected as shown below:

<u>Column 8,</u>
Line 3, "120 15" should read -- 120 --; and
Line 50, "or" should read -- for --.

Signed and Sealed this

Seventh Day of October, 2003

JAMES E. ROGAN
*Director of the United States Patent and Trademark Office*